US010609137B2

(12) United States Patent
Xun

(10) Patent No.: US 10,609,137 B2
(45) Date of Patent: Mar. 31, 2020

(54) GLOBAL LOGICAL TIMESTAMP

(71) Applicant: Microsoft Technology Licensing, LLC, Redmond, WA (US)

(72) Inventor: Lu Xun, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 773 days.

(21) Appl. No.: 14/962,013

(22) Filed: Dec. 8, 2015

(65) Prior Publication Data
US 2017/0063985 A1 Mar. 2, 2017

Related U.S. Application Data

(60) Provisional application No. 62/209,244, filed on Aug. 24, 2015.

(51) Int. Cl.
H04L 29/08 (2006.01)
H04J 3/06 (2006.01)
G06F 1/14 (2006.01)

(52) U.S. Cl.
CPC ............ *H04L 67/1095* (2013.01); *G06F 1/14* (2013.01); *H04J 3/0641* (2013.01); *H04J 3/0661* (2013.01); *H04J 3/0667* (2013.01)

(58) Field of Classification Search
CPC ....... H04L 67/1095; H04J 3/0641; G06F 1/14
USPC ....................................... 709/248
See application file for complete search history.

(56) References Cited

U.S. PATENT DOCUMENTS

| 6,157,957 | A   | 12/2000 | Berthaud |
| 6,377,579 | B1* | 4/2002  | Ofek ................... H04L 12/6418 370/395.4 |
| 6,950,961 | B2  | 9/2005  | Krause et al. |
| 7,114,091 | B2  | 9/2006  | Vrancic |
| 8,037,226 | B2  | 10/2011 | Fredriksson |
| 8,103,643 | B2  | 1/2012  | Danilov et al. |
| 8,441,398 | B2* | 5/2013  | Rao .................... G06F 11/10 342/357.63 |
| 8,595,546 | B2  | 11/2013 | Dalton |
| 8,938,636 | B1* | 1/2015  | Hochschild ........... H04J 3/0661 709/248 |
| 9,274,863 | B1* | 3/2016  | Qiu .................... G06F 11/1474 |
| 2003/0177154 | A1* | 9/2003 | Vrancic ................. G06F 1/12 708/160 |
| 2005/0228902 | A1  | 10/2005 | Lienhart et al. |

(Continued)

OTHER PUBLICATIONS

Bondavalli, et al. "Experimental Validation of a Synchronization Uncertainty-Aware Software Clock", In Proceedings of the 29th IEEE Symposium on Reliable Distributed Systems, Oct. 31, 2010, pp. 245-254.

(Continued)

*Primary Examiner* — Minh Chau Nguyen
(74) *Attorney, Agent, or Firm* — Ray Quinney & Nebeker, P.C.; Thomas M. Hardman; Brandon K. Roper

(57) ABSTRACT

Examples of the disclosure provide for providing a global timestamp in a distributed system. A plurality of nodes are connected via a network. A logical clock is implemented on a node of the plurality of nodes. The logical clock sets a global time for the network, such that another node of the plurality of nodes labels a local event with a global timestamp interval based on the global time provided by the logical clock.

19 Claims, 8 Drawing Sheets

(56) References Cited

U.S. PATENT DOCUMENTS

| | | | |
|---|---|---|---|
| 2006/0280182 A1* | 12/2006 | Williams | H04J 3/0632 370/394 |
| 2008/0170592 A1 | 7/2008 | Hack et al. | |
| 2008/0273527 A1 | 11/2008 | Short et al. | |
| 2009/0248900 A1* | 10/2009 | Marucheck | G06F 1/14 709/248 |
| 2009/0319819 A1 | 12/2009 | Haba | |
| 2014/0006458 A1* | 1/2014 | Hsieh | G06F 16/211 707/803 |
| 2014/0029604 A1 | 1/2014 | Nicholls et al. | |
| 2014/0355628 A1* | 12/2014 | Akhlaq | H04W 56/001 370/509 |
| 2015/0154262 A1 | 6/2015 | Yang et al. | |

OTHER PUBLICATIONS

"International Search Report and Written Opinion Issued in PCT Application No. PCT/US2016/047443", dated Jan. 30, 2017, 18 Pages.

Khandare, et al., "Clock Synchronization in Distributed System", In Proceedings of International Journal of Computer Science and Information Technologies, vol. 4, Issue 3, May 2013, pp. 457-460.

Hunt, et al., "DDOS: Taming Nondeterminism in Distributed Systems", In Proceedings of Eighteenth International Conference on Architectural Support for Programming Languages and Operating Systems, Mar. 16, 2013, 10 pages.

Prakash, et al., "Causality and the Spatial-Temporal Ordering in Mobile Systems", In Journal of Mobile Networks and Applications, vol. 9, Issue 5, Oct. 2014, 18 pages.

Lenzen, et al., "Clock Synchronization with Bounded Global and Local Skew", In Proceedings of 49th Annual IEEE Symposium on Foundations of Computer Science, Oct. 25, 2008, 10 pages.

Sundararaman, et al., "Clock Synchronization for Wireless Sensor Networks: A Survey", In Journal of Ad Hoc Networks (Elsevier), vol. 3, Issue 3, May 2005, pp. 281-323.

Krzyzanowski, Paul, "Clock Synchronization", Published on: Jan. 24, 2014 Available at: http://soft.vub.ac.be/~tvcutsem/distsys/clocks.pdf.

* cited by examiner

GLOBAL LOGICAL TIMESTAMP

CROSS-REFERENCE TO RELATED APPLICATION

This application claims the benefit of U.S. Provisional Application No. 62/209,244, filed Aug. 24, 2015, the entirety of which is hereby incorporated by reference herein.

BACKGROUND

Distributed systems are often characterized by components enabled to interact with each other in order to accomplish system tasks, such that one job or program is executed by more than one computer. In distributed systems, components of networked computers communicate and coordinate events by passing messages. However, distributed systems do not have a global clock that accurately provides a time to every networked machine. Further, distributed systems often experience independent failure of individual components within the system.

SUMMARY

Examples of the disclosure provide a system having a plurality of nodes connected to a network with a logical clock having bounded uncertainty between a plurality of local clocks such that any given node may label a local event with a global timestamp.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure enable a global logical timestamp for a distributed computing system. In some examples, a global time source node provides a logical clock that sets a global time for the distributed system with bounded uncertainty, using message exchange between nodes of the system to propagate the global time with strong consistency.

Aspects of the disclosure further enable highly efficient system event ordering, conflict resolution, and staleness detection in a distributed computing system, with reduced error rates, based on the strong consistency and high availability of the logical clock. For example, in trace analysis, in order to identify whether event A is before or after some other event B, associated event timestamps may be used. In this example, if event A and event B occur on different machines within the distributed system, a determination has to be made as to which time to start searching for event A given the time for event B. In order to do this, aspects of this disclosure provide for identification of a clock skew between the two machines, relative to a global time set by a logical clock of the system.

Additionally, some aspects of this disclosure provide a monotonically increasing sequence associated with the logical clock, and each subsequent epoch of the logical clock within the system, such that uncertainty is minimized and the consistency is maintained for conflict resolution and staleness detection regardless of component failure within the system.

By providing a logical clock for a distributed system, aspects of the disclosure increase the efficiency and accuracy of system event ordering, distributed task management, and conflict resolution, which thereby increases processing speed of the system while reducing network bandwidth usage. These aspects of the disclosure also provide for faster communication between nodes and reduced processor loads. By virtue of the consistency of the global time propagated by the logical clock, aspects of this disclosure further reduce error rates in task coordination and execution.

Figure 1:
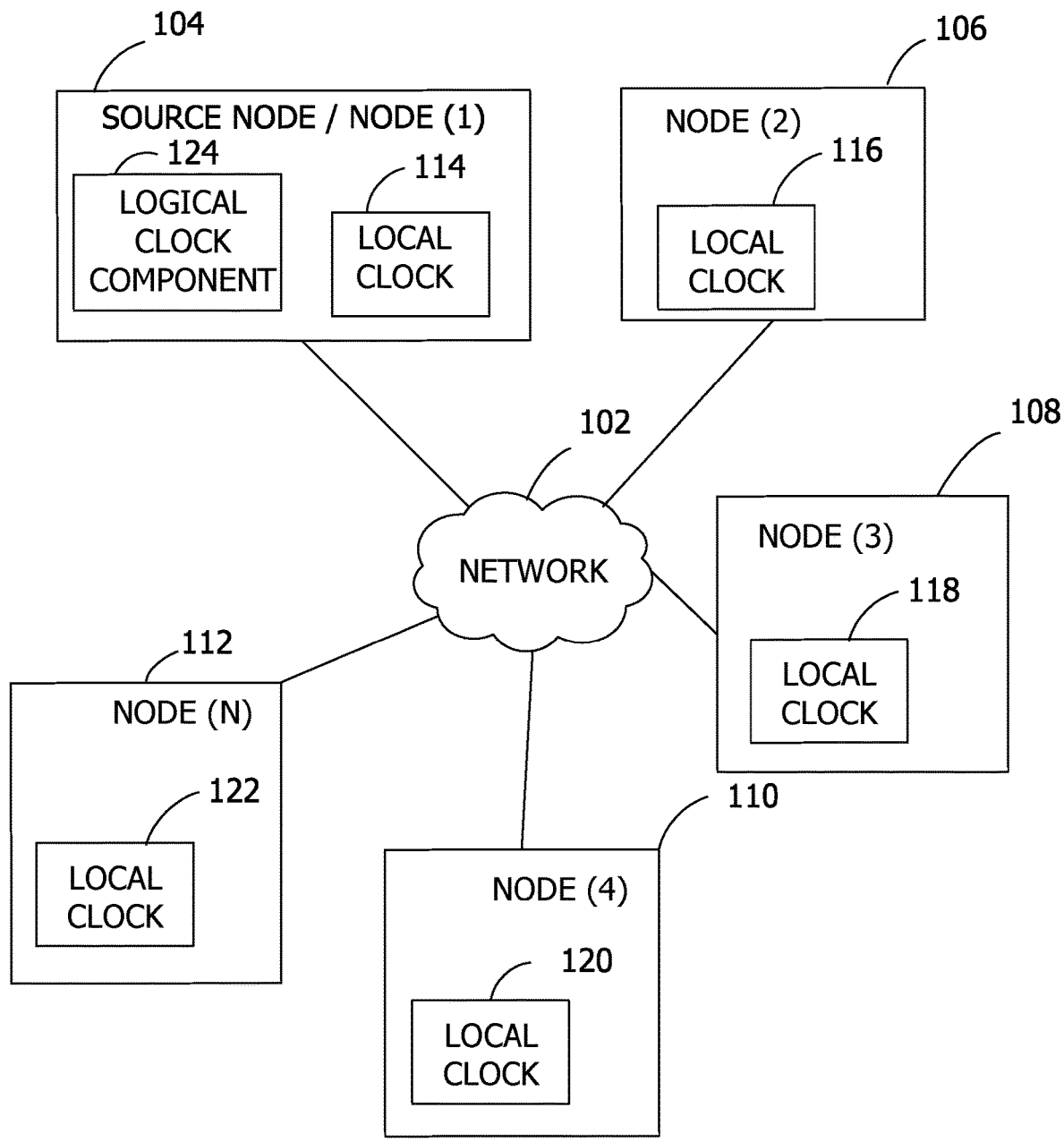
FIG. 1 is an exemplary block diagram illustrating a distributed computing system.

Referring to FIG. 1, an exemplary block diagram illustrates a distributed computing system with a logical clock. In the example of FIG. 1, distributed system 100 may include any number of nodes, the number of which may change dynamically, for example due to nodes joining the network, node loss, node failure, or any other suitable change to the system. The nodes represent any device executing instructions (e.g., as application programs, operating system functionality, or both) to implement the operations and functionality as described herein. In some examples, one or more nodes may be referred to as a computing device. In other examples, one or more nodes may be virtual machines of a distributed system. A node may include a mobile computing device or any other portable device. In some examples, the mobile computing device includes a mobile telephone, laptop, tablet, computing pad, netbook, gaming device, and/or portable media player. A node may also include less portable devices such as desktop personal computers, kiosks, tabletop devices, industrial control devices, wireless charging stations, and electric automobile charging stations. Additionally, a node may represent a server, group of servers, processing unit, group of processing units, or other computing devices.

In some examples, a computing device has at least one processor, a memory area, and at least one user interface. The processor includes any quantity of processing units, and is programmed to execute computer-executable instructions for implementing aspects of the disclosure. The instructions may be performed by the processor or by multiple processors within the computing device, or performed by a processor external to the computing device. In some examples, the processor is programmed to execute instructions such as those illustrated in the figures (e.g., FIG. 5-6).

In some examples, the processor represents an implementation of analog techniques to perform the operations described herein. For example, the operations may be performed by an analog computing device and/or a digital computing device.

The computing device further has one or more computer readable media such as the memory area. The memory area includes any quantity of media associated with or accessible by the computing device. The memory area may be internal to the computing device, external to the computing device, or both (not shown). In some examples, the memory area includes read-only memory and/or memory wired into an analog computing device.

The memory area further stores one or more computer-executable components. Exemplary components may include a communications interface component, a logical clock component, a leader election component, a sequence generator component, and a clock skew component. The logical clock component, for example, when executed by the processor of a computing device, causes the processor to set a global time for the distributed system.

In some examples, the communications interface component includes a network interface card and/or computer-executable instructions (e.g., a driver) for operating the network interface card. Communication between the computing device and other devices or nodes may occur using any protocol or mechanism over any wired or wireless connection. In some examples, the communications interface is operable with short range communication technologies such as by using near-field communication (NFC) tags.

Referring again to FIG. 1, distributed system 100 includes network 102 that connects nodes of the system, such as the exemplary nodes illustrated. Every node, or machine, has a local clock that advances at the same rate, although the absolute values of the local clocks may have unbounded skew. Rather than attempting to approximate a real, physical clock, aspects of this disclosure implement a logical clock within distributed system 100. In some examples, a logical clock may be a logic component that uses a local clock of an elected leader node within the system to generate the global time, or the global timestamp, for the system. In a distributed system that supports leader election, such as distributed system 100 in this example, a leader election mechanism may elect a leader, or source node, as the global time source node. The global time source node implements the logical clock, or logical clock component, to set the global time for the system. Every node of the system may have an instance of the logical clock component, which is implemented to provide the global time in response to a given node being elected as the global time source node, for example. A logical clock component may have a leader sub-component and a non-leader subcomponent. In these examples, an instance of the logical clock component implemented on the leader node enables the leader sub-component for that instance, while other instances of the logical clock component implemented on other nodes of the system enable the non-leader sub-component. The logical clock component may use the local clock of the global time source node as the global time, in some examples. In other examples, the logical clock component implemented on a leader node, with a leader sub-component enabled, may set the global time based off of an external clock that is considered to be consistently accurate. In these examples, the local clock of the leader, or source node, accurately reflects the global time. An interval, such as [Low, High], may be used to specify the bound of the clock skew between any given node's local clock and the global clock. The bound of the clock skew between a node's local clock and the global clock may also be referred to as an uncertainty bound. In this illustrative example, the interval or uncertainty bound for the leader node will be [L, H], where L=H.

When a node joins distributed system 100 the node may have no knowledge of its own clock skew, and may initially set its clock skew interval from minus infinity to infinity, for example. Nodes within distributed system 100 obtain knowledge about the global time and the clock skew through message exchange, with each node refining its own uncertainty bound to a smaller interval with increased message exchanges.

In the illustrative example of distributed system 100, node (1) 104 has been elected as the source node, or leader. Leader election may be made by any suitable leader election mechanism configured to run in a network environment. Distributed system 100 also includes node (2) 106, node (3) 108, node (4) 110, and node (N) 112, in this illustrative example. Each node has a local clock, as depicted by local clock 114, local clock 116, local clock 118, local clock 120, and local clock 122. Source node/node (1) 104 implements logical clock component 124 to provide the global time for the distributed system. Logical clock component 124 may set the global time to be the same time as local clock 114 in this example, with the clock skew for source node/node (1) 104 set at [0, 0]. In this example, when source node 104 is elected as the leader, or global time source node, source node 104 implements the logical clock component 124, and logical clock component 124 will determine the global time based on local clock 114.

Node (2) 106 may have a clock skew with a lower bound and upper bound calculated or obtained by exchanging messages with source node 104 and learning the global time provided by logical clock component 124. Node (3) 108 may exchange messages with node (2) 106 to obtain knowledge of the global time and set its own clock skew based on the clock skew obtained from node (2) 106, for example. The nodes of distributed system 100 may obtain the global time and the information used to calculate and set their own clock skew by exchanging messages with any node in the system, regardless of whether they are directly exchanging messages with the designated leader node, or source node.

Figure 2:
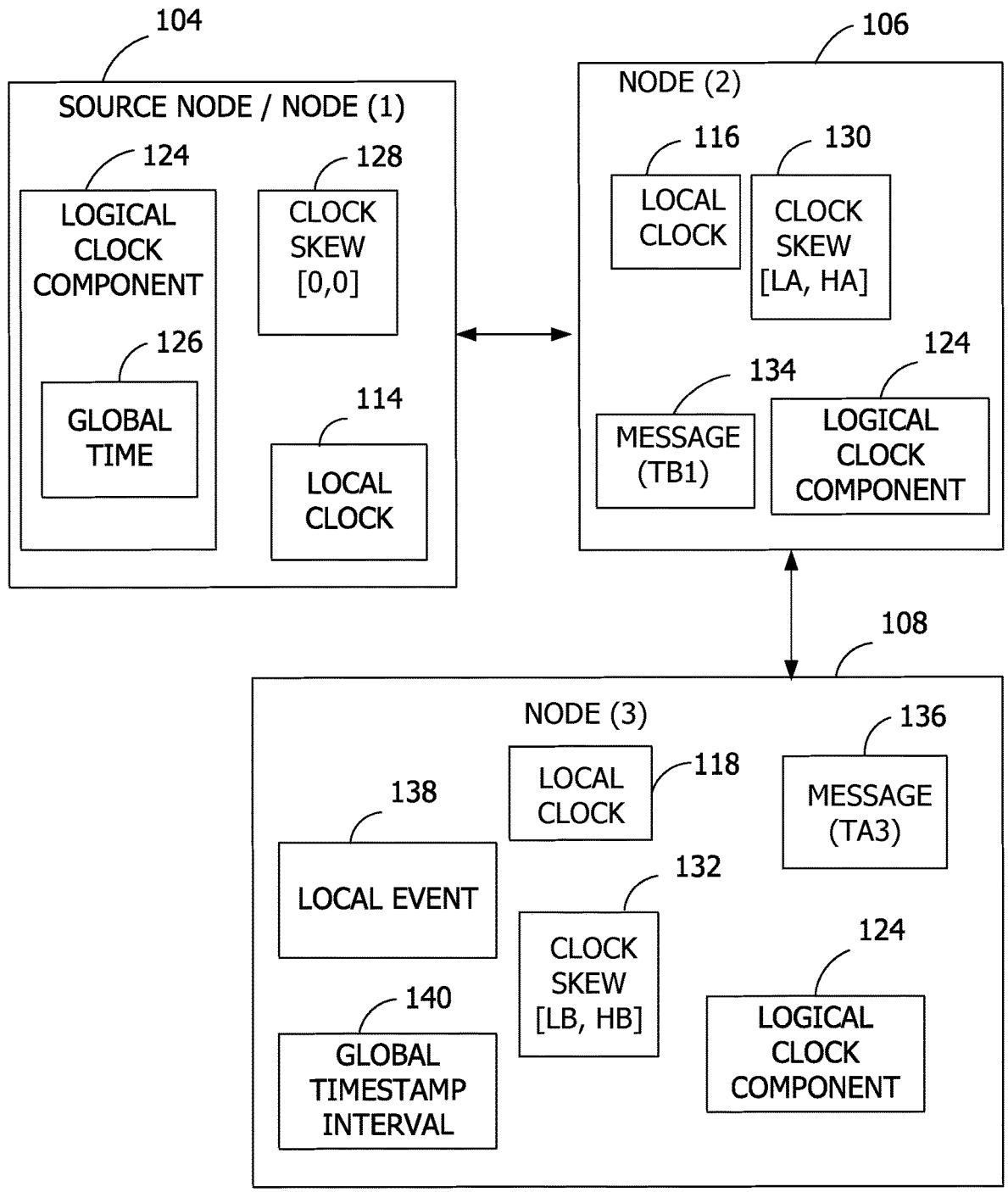
FIG. 2 is an exemplary block diagram illustrating a logical clock for a distributed computing system.

FIG. 2 illustrates one example of message exchange between nodes of distributed system 100. In this illustrative example, each node has an instance of logical clock component 124, which may be implemented on top of the message exchange layer in some examples. Source node/node (1) 104 provides global time 126, and has clock skew 128 set at [0, 0] as the first leader node in this example. In these examples, logical clock component 124 is configured to calculate the clock skew for an individual node, generate global timestamps for system events, and implement the logical clock to provide the global time if its associated node is elected as a leader node. For purposes of brevity in illustration, let node (2) 106 be referred to herein as Node A, and node (3) 108 be referred to herein as Node B. Node A may already have knowledge about its clock skew 130, in this example, such that [LA, HA] are valid numbers. Node B initially may have no knowledge of its actual clock skew, and may have initially set clock skew 132 at minus infinity to infinity.

In this example, Node B may calculate its actual clock skew [LB, HB] by exchanging messages with Node A. Node B sends message 134 to Node A. Message 134 includes a timestamp of the send time (TB1) according to local clock 118 of Node B. The local clock 116 of Node A marks the time of receipt (TA2). Node A may now conclude that the global time of (TA2), the time message 134 from Node B was received, must be later than the global time of (TB1), the time message 134 was sent according to the local clock 118 of Node B. Let OA be the clock skew that is used to adjust local clock 116 of Node A to the global time 126 provided by the instance of logical clock component 124 implemented at source node 104, and OB be the offset for Node B. This provides that the time message 134 was received (TA2) plus the value of the upper bound of clock skew 128 (HA) is greater than the time message 134 was sent (TB1) plus the offset (OB). In other words:

$$TA2+HA>TB1+OB$$

By definition: LA≤OA≤HA, which provides that:

$$TA2 + HA > TB1 + OB = \, > OB < HA + (TA2 - TB1)$$

This gives the upper bound (HB) of clock skew 132 for Node B. Node A may now send this knowledge back to Node B via message 136, and in message 134 Node A may include a send time (TA3) along with the lower bound (LA) for Node A. Node B receives message 136 at a time (TB4) according to local clock 118 of Node B. Which provides:

$$TB4 + OB >$$
$$TA3 + OA = \, > TB4 + OB > TA3 + LA = \, > OB > LA + (TA3 - TB4)$$

This in turn provides the lower bound (LB) of clock skew 132 for Node B, such that after the round trip message exchange between Node A and Node B, Node B may set its clock skew 132 to: [LA+(TA3−TB4), HA+(TA2−TB1)].

This global time logic may be used by any node of distributed system 100 after the initial interval, or clock skew, is set in order to propagate the global time throughout the system via message exchange. In these examples, logical clock component 124 may calculate and set clock skews for local nodes based on information from message exchanges. Every time a node calculates a new lower bound or upper bound, the node may compare with the previous clock skew set by logical clock component 124 and update the interval with a tighter interval to have an increasingly more accurate knowledge of its clock skew. This provides accuracy and consistency for global time 126 propagated throughout the distributed system based on logical clock component 124.

For the source node, whose local clock is essentially the global clock while the node is the leader, the interval or clock skew will always be [L, H], where L=H. For any node that has a message exchange with a source node, the size of the interval (or the amount of uncertainty) will be the message delays of the two messages exchanged. In general, nodes with more distance from the source node may have larger uncertainties which increase with message delay.

As an illustrative example, in a scenario where a time lapse (T) has occurred between a pair of nodes exchanging messages, they either do not communicate at all, or have exchanged many messages, and at least in one of the message exchanges, the round trip message delay is TD. In this example scenario, considering a graph of nodes where an edge exists between any two nodes that ever talk to one another, the size of the uncertainty interval of a node will be TD*r, where "r" is the distance of that node to the source node with the global clock.

The illustrative aspects of this disclosure provide a model where every node will be able to estimate the global clock based on its local clock with an uncertainty bound. This means that every node may label its local event with a global time interval, or global timestamp. In a distributed system, with events occurring across multiple nodes of the system, where two events have global intervals that do not overlap the order of events may be accurately declared.

For example, node (3) 108 may execute local event 138. The instance of logical clock component 124 implemented on node (3) 108 may label local event 138 with global timestamp interval 140 based off the local clock 118 in combination with the clock skew 132 set after message exchange with node (2) 106 to determine the accurate global time 126 for the system. This is one illustrative example of how system events may be labeled with a global timestamp.

In practice, the clock rate for each local clock will have small differences, referred to as clock drift. A local clock may drift for as much as Dt after a period of time (T). On every node other than the source node, the uncertainty interval may be increased by DT after ever T. This drift rate may be a set rate for the system or for a node. The drift rate may be set after it is initially determined or calculated based on any number of methods, such as observation, testing, experimentation, for example. This uncertainty, or clock skew, while periodically increased due to drift, is continually reduced with each message exchange between nodes. The message exchange rate may be configured to balance the drift rate in such a way that provides high consistency for the global time provided by the logical clock of the system. In other words, the more messages that are exchanged between nodes of the system, the tighter the uncertainty interval becomes.

While the source node has been depicted as node (1) 104 in FIGS. 1 and 2 for illustrative purposes, the source node may be any node of the system, and may change from one node to another node in a distributed system. In some examples, a source node implementing the logical clock may fail. While the global time may still be propagated by other nodes of the system, the knowledge of the global time may not improve and as other nodes fail, the uncertainty may increase. In some examples, a distributed system may use a physical clock as a backup to periodically adjust its time with the physical clock and mitigate uncertainty interval increases.

In some aspects of this disclosure, another node of distributed system 100 takes over the leader role as global time source node to assume accurate knowledge of the global time and implement the logical clock. In the illustrative scenario where the initial source node fails, a leader election mechanism may run to elect a new leader as the new global time source node. The new global time source node may select a particular point in its uncertainty interval and declare that point to be the new global time. Once the new global time is selected, the new global time source node will have no uncertainty, but a non-0 skew, meaning the lower bound and upper bound will be of the same value for the new clock skew of the new global node source node. The new global node source node may then propagate its knowledge to other nodes of the system, through any suitable methods, including broadcast messaging or organically as message exchange continues to occur within the system.

As an illustrative example of a shifting logical clock, where the source node role changes from one node to another node within the system, consider Node A is initially the authority or leader providing the logical clock and thereby the global time. This first era of global time may be referred to as Epoch 1. Node B has knowledge of its own clock skew, such that when the local clock of Node B is 3:00 PM, the actual global clock is between [L 3:01, H 3:03]. In this example, Node A fails and Node B is elected as the new source node. Following election, Node B selects 3:03 as the new global time, for example, and resets its clock skew to [L 3:03, H 3:03], a zero uncertainty interval. While any point in the interval may be selected, in this illustrative example the upper bound is selected in order to provide the additional property that the global time continues to increase even with a source node failure. Node B now provides the logical clock for the system, and the new global time provided is associated with Epoch 2. The local clock on Node B does not change, but Node B now knows to add three minutes to the time provided by its local clock when calculating global time for the system.

To differentiate between different epochs of the logical clock, every node assumes the logical clock role much have an epoch number that is monotonically increasing, such that a node with a previous epoch may discard its current uncertainty interval and re-calculate the new interval based on message exchanges during the new epoch. In this example, when Node C exchanges messages with Node B and learns Node B is providing global time for Epoch 2, Node C may have previous knowledge of the global time for Epoch 1 and a clock skew set for Epoch 1. Node C may now recalculate its clock skew for Epoch 2 using the global time provided by Node B. As the system orders events it takes epochs into consideration, and given an overlapping interval provided by a change in epoch, the system will declare the associated events cannot be ordered, thus providing consistency.

The epoch numbers may be provided by a sequence generator service or mechanism configured to issue strictly monotonically increasing sequence numbers. When a node is elected as the source node, the sequence generator service may generate a new epoch number at the time of election, or may delay generating the new epoch number until a point in time where the uncertainty interval is large enough. This determination of whether the size of an uncertainty interval warrants generating a new epoch, and thus selecting a new global time and adjusting clock skews accordingly, may be a pre-set precision threshold within the system, in some examples. Where the uncertainty interval is small enough, there is no need to adjust the epoch, for example where the interval is within a few seconds the uncertainty interval may be considered small enough to maintain the current epoch.

To compare logical time frame from two different epochs, a restriction may be placed on the amount of adjustment that may occur to an uncertainty interval. For example, instead of the new source node setting the lower bound with the upper bound, the new source node may only be allowed to increase the lower bound by a maximum value of D when the system increments an epoch by one (1). With this restriction, two intervals from different epochs may be compared. For example, consider an uncertainty interval [L, H] with epoch E1. By definition, the global time (G1) in E1 satisfy the following where T is the local time:

$$T+L<G1<T+H$$

Next consider epoch E2=E1+1, the global time G2 may be shifted from G1 by a maximum of D, therefore:

$$T+L<G2<T+H+D$$

This means that the uncertainty interval may be safely translated to a new interval [L, H+D] in E2.

In an illustrative example where an epoch may be missing, due to message loss or node failure, the new source node may have a larger uncertainty interval but consistency is still guaranteed.

Figure 3:
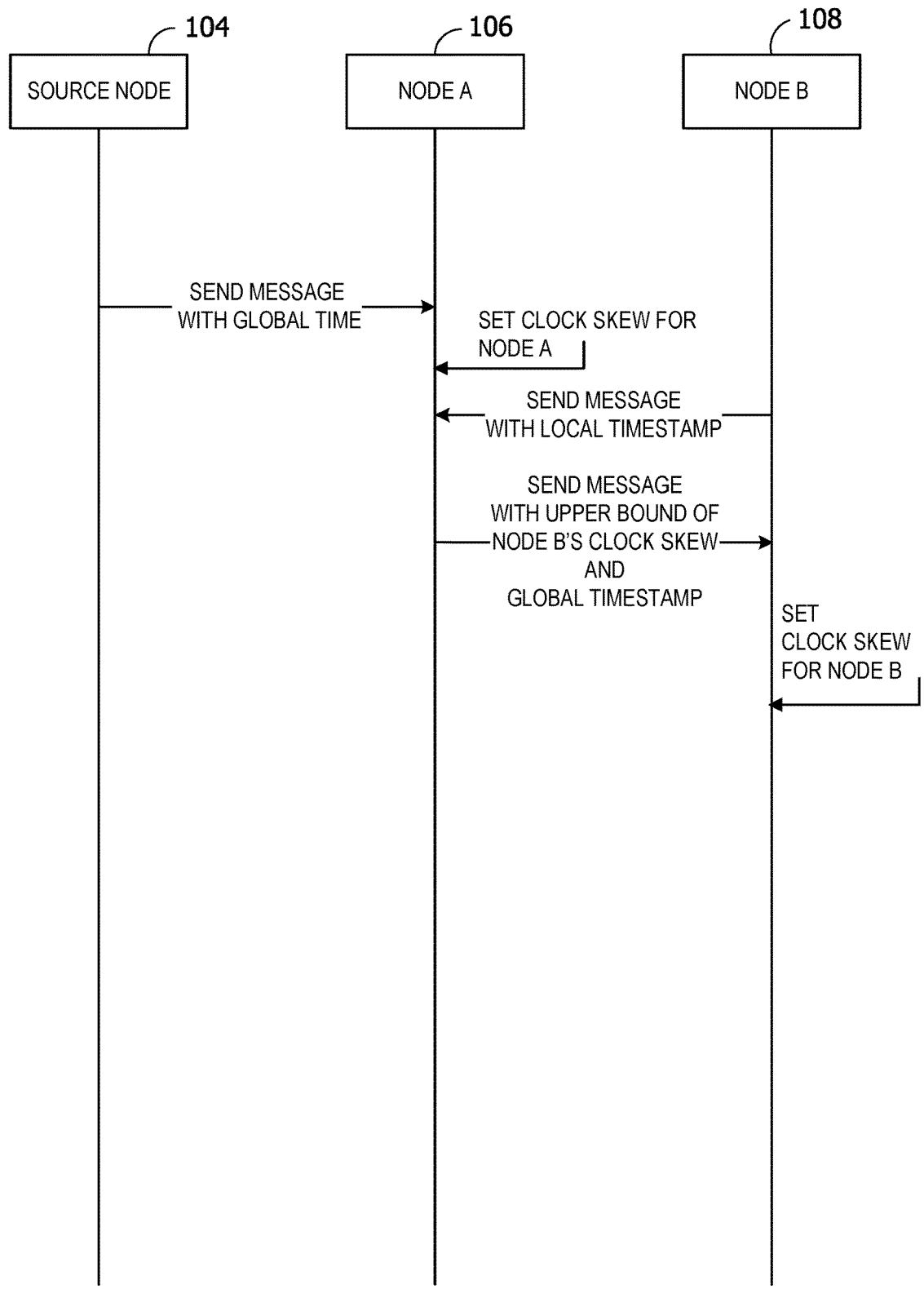
FIG. 3 is an exemplary diagram illustrating a first epoch of a global time for a distributed computing system.

With reference now to FIG. 3, an illustration is provided for a first epoch, Epoch-1 300, where the initial source node elected provides the global time. In this exemplary diagram, Node A 106 sets its own clock skew using the global time provided by the source node 104. Node A may have a message exchange with the source node in order to obtain the global time and set the uncertainty interval for Node A, for example. When Node A 106 receives a message sent by Node B 108 with a local timestamp of the send time from the local clock of Node B 108, Node A 106 uses its knowledge of its own clock skew and the global time to calculate the upper bound of the clock skew for Node B 108. Node A 106 sends back a message that includes the upper bound for Node B's clock skew along with a global timestamp of the message send time. When Node B 108 receives the message back from Node A 106, Node B 108 may calculate its lower bound using the upper bound and the global timestamp, and set its own clock skew. By message exchange, each node in the system obtains knowledge of the global time and its own clock skew so that system events are labeled with a consistent global timestamp, and thus accurately ordered.

Figure 4:
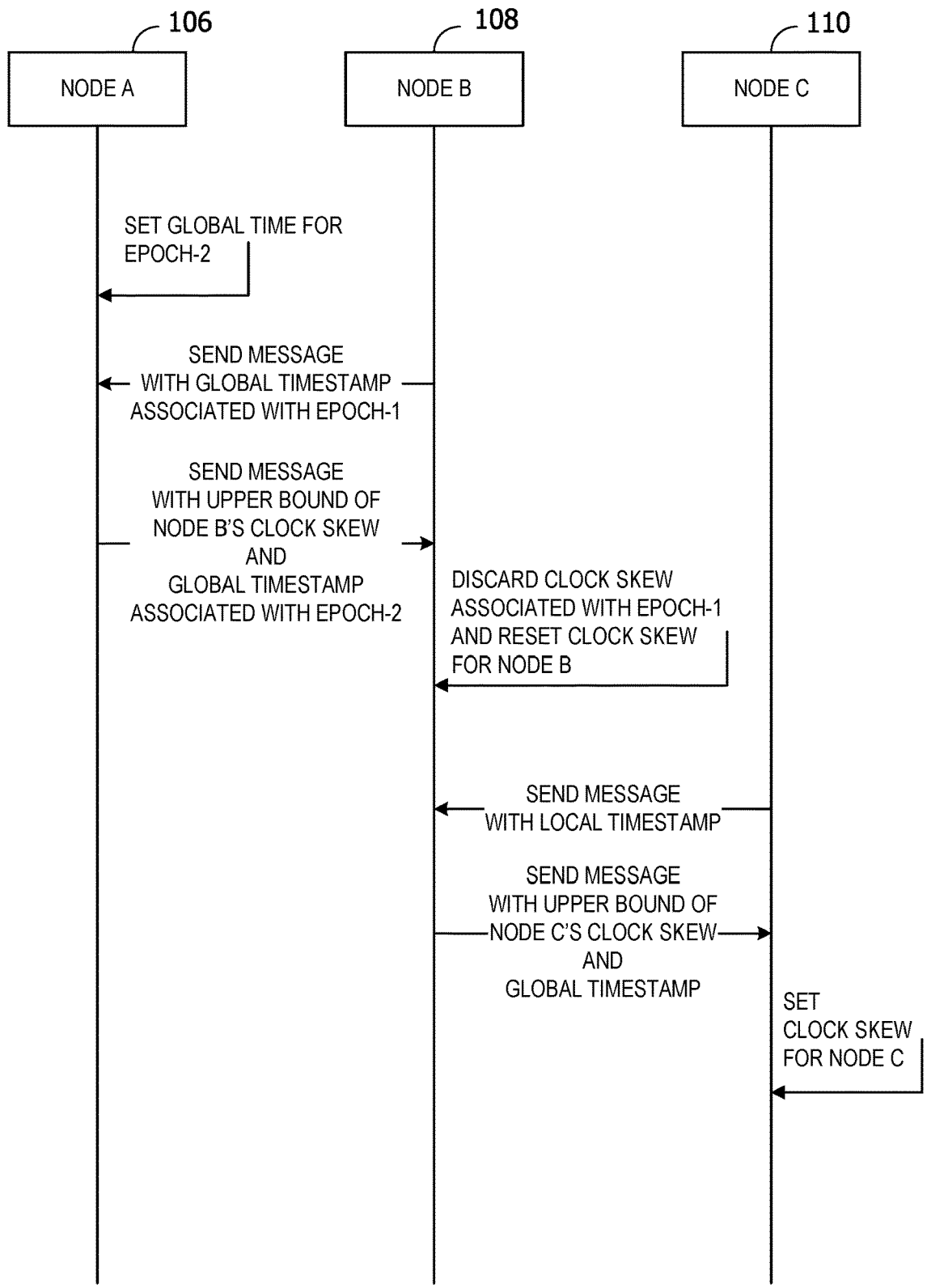
FIG. 4 is an exemplary diagram illustrating a second epoch of a global time for a distributed computing system.

With reference now to FIG. 4, an illustration is provided for a second epoch, Epoch-2 400, where the initial source node has failed and Node A 106 has been elected as the new source node. In this exemplary diagram, Node A 106 sets the global time for Epoch-2 400 by selecting a point in its previous uncertainty interval as the new global time and resetting its own clock skew to a zero uncertainty interval. When Node A 106 receives a message sent by Node B 108 with a global timestamp of the send time associated with Epoch-1 300, Node A 106 calculate a new upper bound of the clock skew for Node B 108 based on the global time for Epoch-2 400 and sends this knowledge back to Node B 108. When Node B 108 receives the message back from Node A 106 indicating a new epoch, Node B 108 discards its previous clock skew associated with Epoch-1 300 and resets its clock skew, calculating its lower bound using the new upper bound and the global timestamp from Node A 106. When Node C 110 comes up in the network, having no initial knowledge of its clock skew, and sends a message to Node B 108 with a local timestamp of the send time, Node B 108 calculates the upper bound of the clock skew for Node C 110 based on the global time and Node B's knowledge of its own clock skew and sends that knowledge back to Node C 110. Node C 110 may then set its own clock skew for the global time, in this example.

Figure 5:
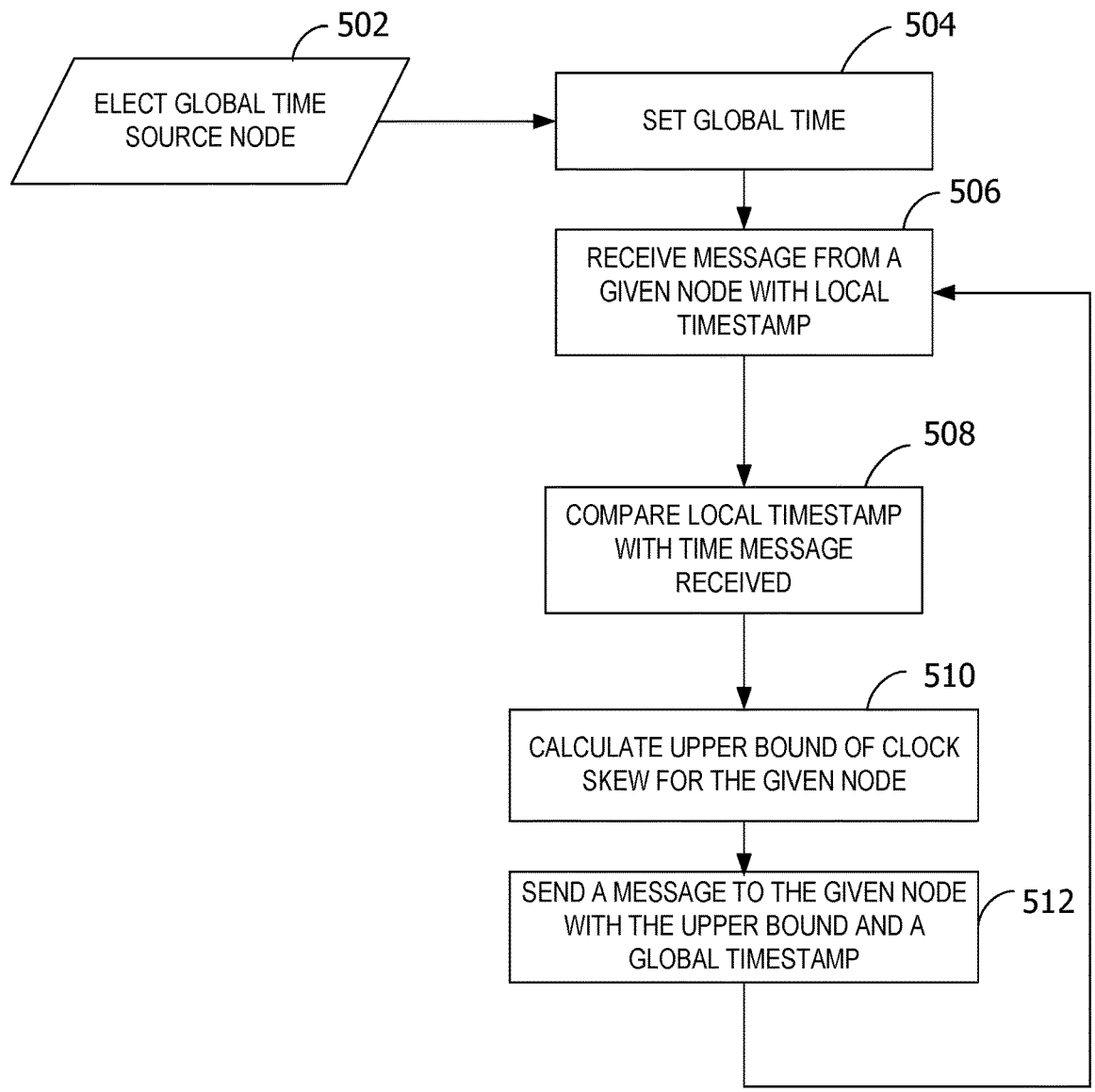
FIG. 5 is an exemplary flow chart illustrating operation of the logical clock to provide a global time.

FIG. 5 is an exemplary flow chart illustrating operation of the logical clock to provide a global time. The logical clock may be implemented on any node or computing device of a distributed computing system, such as distributed system 100 in FIG. 1, for example.

The process begins with election of a global time source node at operation 502. The elected global time source node implements a logical clock to set a global time at operation 504. The process receives a message from a given node with a local timestamp of the send time according to a local clock of the given node at operation 506. The process compares the local timestamp with the global time at operation 508.

The process calculates the upper bound of a clock skew for the given node at operation 510, and sends a message to the given node with the upper bound and a global timestamp of the time the message was sent at operation 512. The process may iteratively repeat as messages are exchanged within the system. The process may also continue when transferred to another thread or node after node failure and subsequent election of a new global time source node, in some examples.

Figure 6:
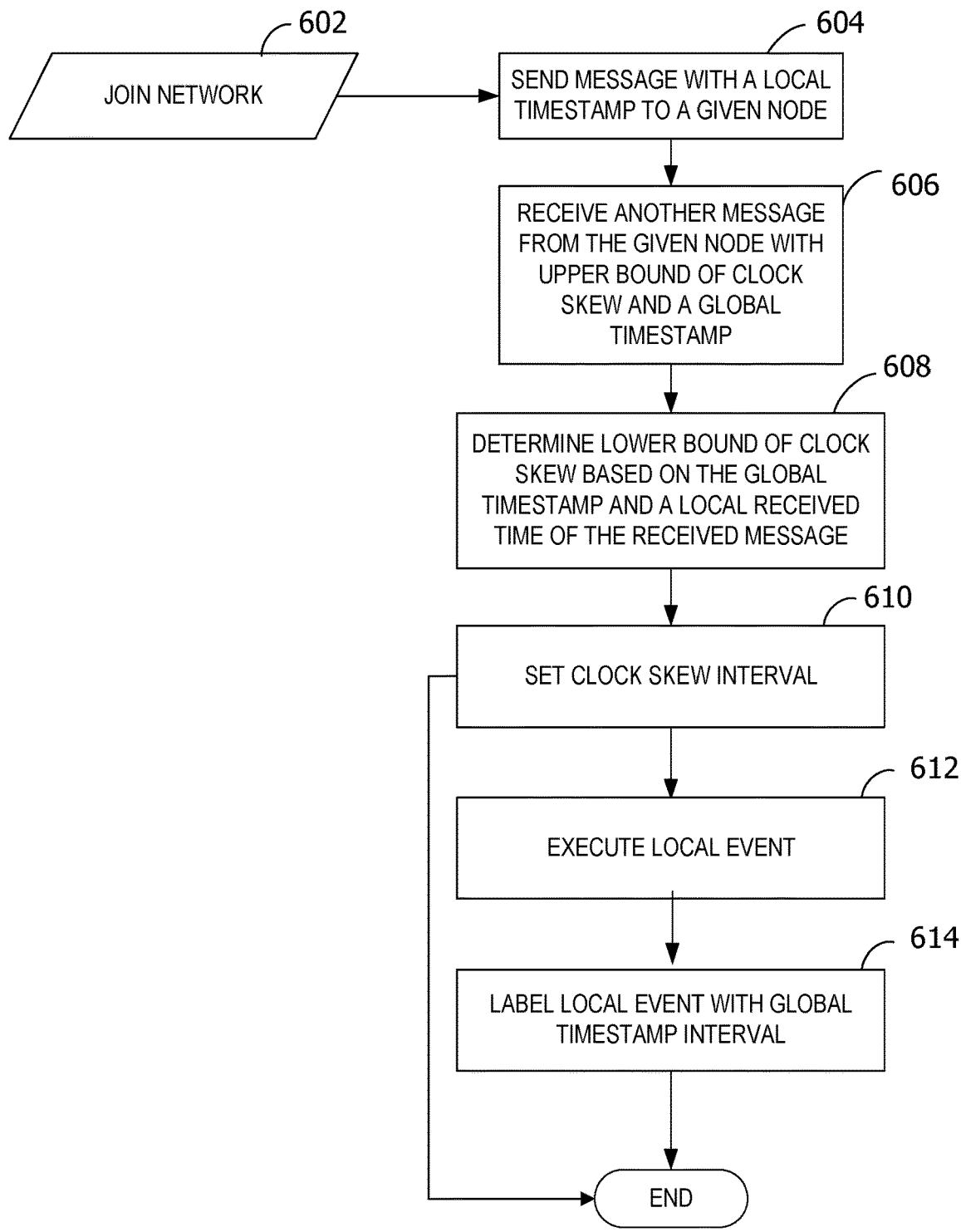
FIG. 6 is an exemplary flow chart illustrating operation of a node in a distributed computing system setting a clock skew based on a global time.

FIG. 6 is an exemplary flow chart illustrating operation of a node in a distributed computing system setting a clock skew based on a global time. The example operations in FIG. 6 may be performed by a node other than a source node in a distributed system, for example.

The process begins when a node joins a network of a distributed computing system at operation 602. The process sends a message to a given node, with a local timestamp of the send time according to a local clock of the sending node at operation 604. The process receives another message from the given node with an upper bound value for the clock skew and a global timestamp of the send time for the other message according to the sending node at operation 606.

The process determines a lower bound value for the clock skew based on the global timestamp of the sent time for the other message and a local timestamp of the received time when the other message is received at operation 608. The process uses this knowledge to calculate and set the clock skew interval, or uncertainty interval, at operation 610. The process may terminate after operation 610, or optionally may executed a local event at operation 612. The local event may be any system event or task executed by the node as part of a distributed task or system task, for example. The process labels the local event with a global timestamp interval at operation 614, with the process terminating thereafter. The global timestamp interval is generated using the clock skew interval set based off the global time propagated by the source node, for example. In this way, system events occurring at individual nodes may be labeled with a global timestamp interval, providing for more accurate ordering of system events executed across multiple nodes of a distributed system.

Additionally, the process may iteratively adjust the set clock skew with each message exchange to further decrease the uncertainty, tightening the interval, and increasing the accuracy of global timestamps associated with system events.

Additional Examples

In some examples, an iteration of an epoch may be lost due to node failure or packet loss, for example. In an example scenario, where Node A is the initial source node for Epoch 1, Node A fails and Node B takes over as the new source node for Epoch 2. However, before Node B is able to exchange any messages with another node, Node B fails. Node C is elected as the new source node and the sequence generator mechanism assigns the global time selected by Node C as Epoch 3. Even though none of the current nodes have any knowledge about Epoch 2 and the associated global time for Epoch 2, the consistency may be maintained by virtue of a restriction placed on the adjustment to a lower bound of the interval with each evolution of an epoch.

In addition, the examples herein provide a method that addresses failover within the system, when a leader node goes down, with each new epoch and the resulting adjustment to uncertainty levels to maintain consistency as the logical clock shifts across different authorities. Aspects of the disclosure provide a highly reliable, highly consistent global logical clock that enables accurate system event ordering with global timestamps.

Alternatively, or in addition to the other examples described herein, examples include any combination of the following:

wherein the node is a leader node elected by a leader election mechanism within the network;

another node of the plurality of nodes, the other node elected as a new leader node in response to the leader node becoming unavailable;

another logical clock implemented on the other node, wherein the other logical clock is an instance of the logical clock, the other logical clock setting a new global time for the network based on the election of the other node as the new leader node;

a local clock implemented on the node, the logical clock setting the global time for the network based on the local clock;

wherein the node exchanges one or more messages with at least one other node of the plurality of nodes, the one or more messages including the global time set by the logical clock;

wherein the at least one other node comprises a local clock, and wherein the at least one other node sets a local clock skew based on a difference between the global time and a local time of the local clock;

a plurality of logical clock components implemented on the plurality of nodes in the network, such that a given node comprises an instance of the logical clock;

wherein an individual logical clock component of the plurality of logical clock components sets a clock skew for an associated individual local node based on information from one or more message exchanges between one or more nodes of the plurality of nodes in the network;

comparing the timestamp included with the received message to a time the message was received by the source node, the time the message was received based on the global time set by the source node;

calculating an upper bound of a clock skew for the other node based on a difference between the time the message was received by the source node and the time the message was sent by the other node;

wherein the other node receives the upper bound of the clock skew from the source node via another message, the other message including another timestamp corresponding to a time the other message was sent by the source node based on the global time set by the source node, and wherein the other node calculates a lower bound for the clock skew using the upper bound and the other timestamp;

wherein the source node performs a leader node role, and wherein the leader node role shifts to another node in response to the source node becoming unavailable;

wherein the source node receives a subsequent message from the other node and provides an updated uncertainty bound to the other node;

the first node executing a local event;

the first node labeling the executed local event with a global timestamp interval, the global timestamp interval determined using the clock skew interval and a current time of the local clock;

the first node receiving a third message from a third node, the third message including a timestamp corresponding to a time the third message is sent as generated by another local clock of the third node;

the first node calculating an upper bound of a clock skew for the third node using the timestamp corresponding to the time the third message is sent and the clock skew interval for the local clock of the first node;

the first node sending a fourth message to the third node, the fourth message including the upper bound of the clock skew for the third node and another global timestamp corresponding to a time the fourth message is sent by the first node;

a leader election mechanism detecting unavailability of a leader node;

the leader election mechanism electing the first node as a new leader node;

the first node as the new leader node setting a new global time using the local clock of the first node;

wherein the clock skew interval for the local clock of the first node is updated at each message exchange with another node;

wherein system events executed across the plurality of nodes within the network are labeled with the global timestamp interval.

In some examples, the operations illustrated in FIG. 5 and FIG. 6 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

Exemplary Operating Environment

Figure 7:
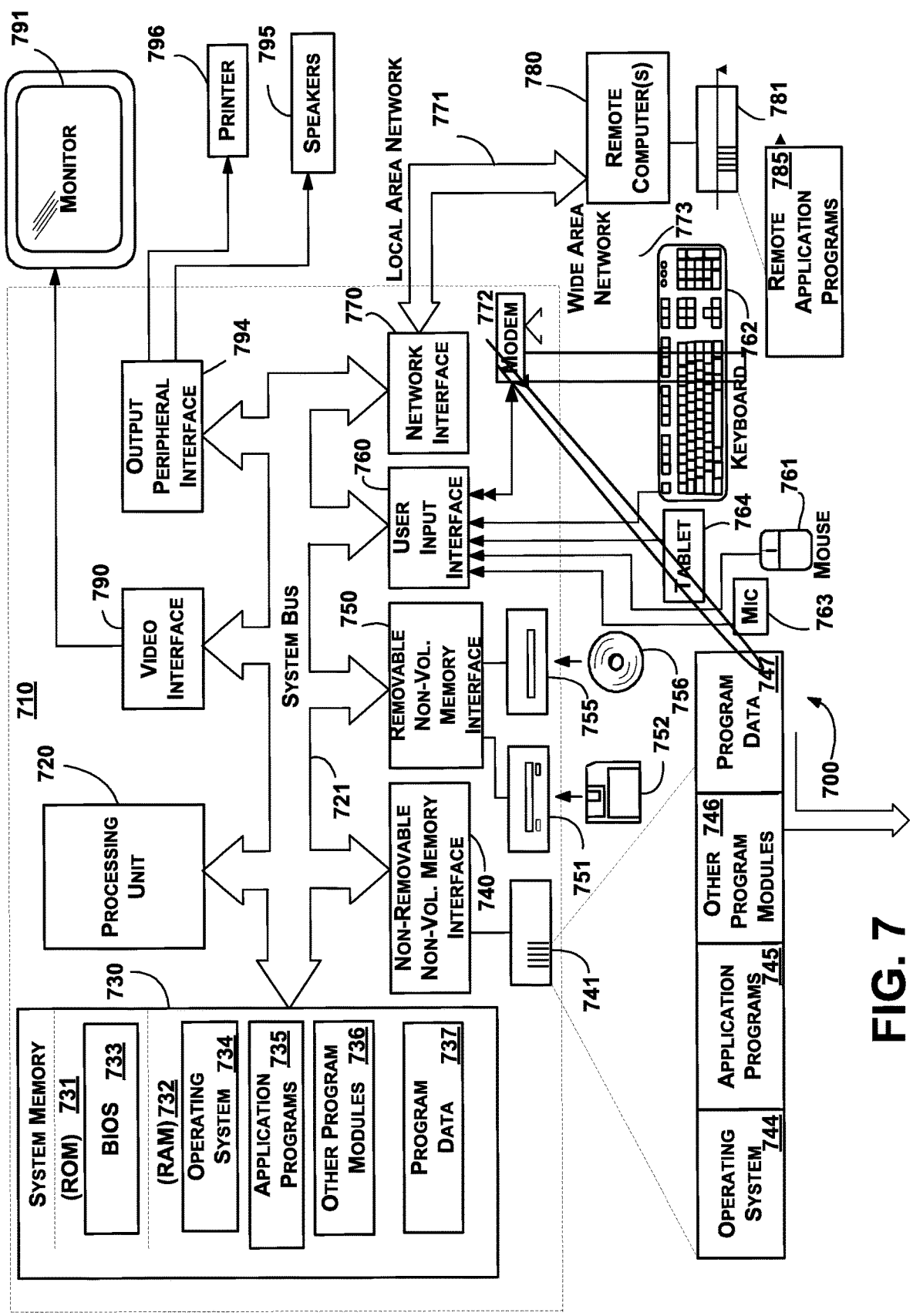
FIG. 7 is an exemplary block diagram illustrating an operating environment for a computing device implementing a logical clock component.

With reference to FIG. 7, an exemplary system for implementing various aspects of the disclosure may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media may be any available media that may be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Memory 731 and 732 are examples of computer storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the computer 710. Computer storage media does not, however, include propagated signals. Rather, computer storage media excludes propagated signals. Computer storage media are tangible and mutually exclusive to communication media. Computer storage media are implemented in hardware and exclude carrier waves and propagated signals. Computer storage media for purposes of this disclosure are not signals per se. Any such computer storage media may be part of computer 710.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components may either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel may be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

Figure 8:
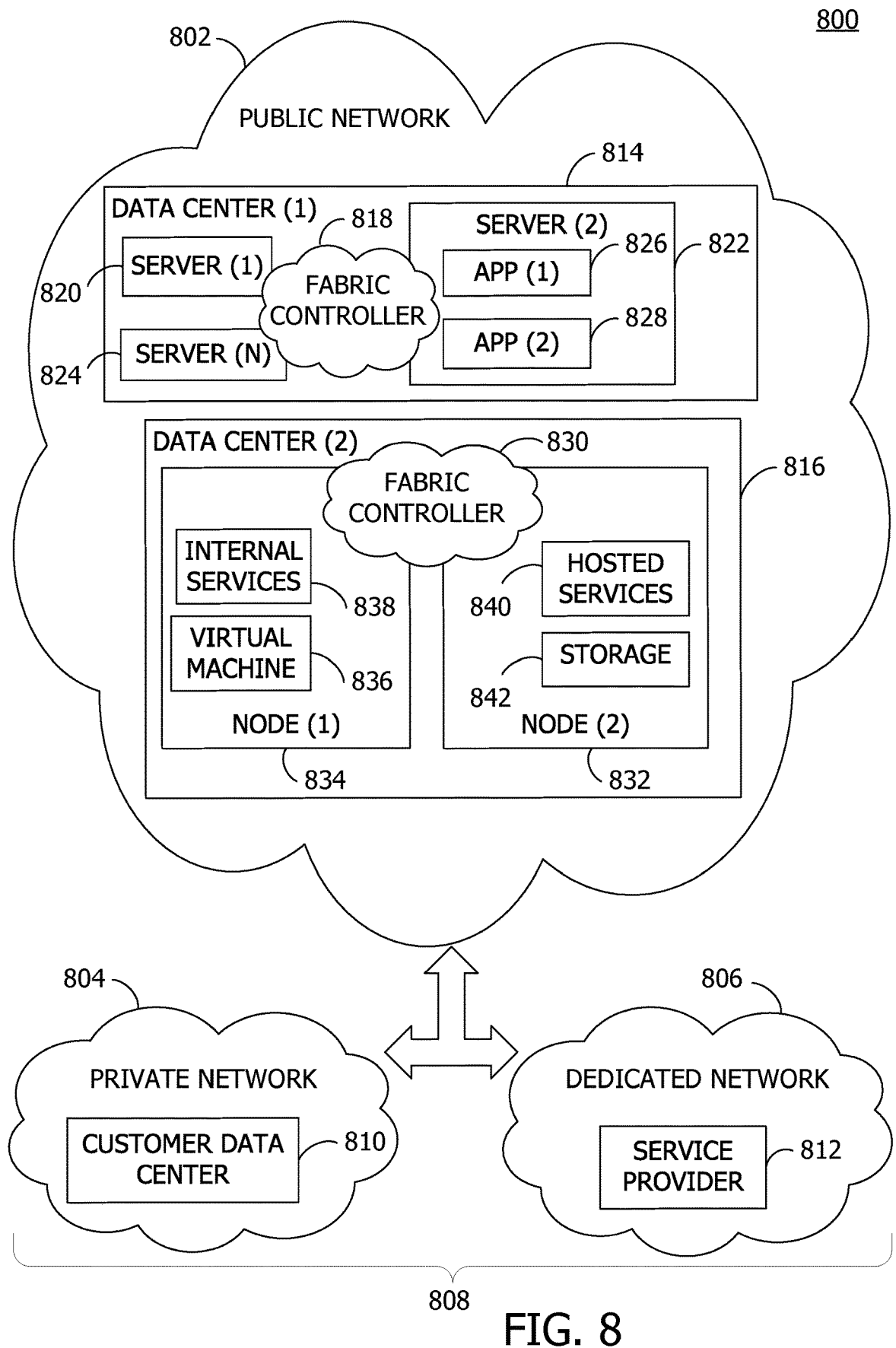
FIG. 8 is an exemplary block diagram illustrating a cloud computing environment for implementing a logical clock.

With regard to FIG. 8, an exemplary block diagram illustrates a cloud-computing environment for implementing a logical clock. Architecture 800 illustrates an exemplary cloud-computing infrastructure, suitable for use in implementing aspects of the disclosure. Architecture 800 should not be interpreted as having any dependency or requirement related to any single component or combination of components illustrated therein. In addition, any number of nodes, virtual machines, data centers, role instances, or combinations thereof may be employed to achieve the desired functionality within the scope of examples of the present disclosure.

The distributed computing environment of FIG. 8 includes a public network 802, a private network 804, and a dedicated network 806. Public network 802 may be a public cloud, for example. Private network 804 may be a private enterprise network or private cloud, while dedicated network 806 may be a third party network or dedicated cloud. In this example, private network 804 may host a customer data center 810, and dedicated network 806 may host an internet service provider 812. Hybrid cloud 808 may include any combination of public network 802, private network 804, and dedicated network 806. For example, dedicated network 806 may be optional, with hybrid cloud 808 comprised of public network 802 and private network 804.

Public network 802 may include data centers configured to host and support operations, including tasks of a distributed application, according to the fabric controller 818. It will be understood and appreciated that data center 814 and data center 816 shown in FIG. 8 is merely an example of one suitable implementation for accommodating one or more distributed applications and is not intended to suggest any limitation as to the scope of use or functionality of examples of the present disclosure. Neither should data center 814 and data center 816 be interpreted as having any dependency or requirement related to any single resource, combination of resources, combination of servers (e.g. server 820, server 822, and server 824) combination of nodes (e.g., nodes 832 and 834), or set of APIs to access the resources, servers, and/or nodes.

Data center 814 illustrates a data center comprising a plurality of servers, such as server 820, server 822, and server 824. A fabric controller 818 is responsible for automatically managing the servers and distributing tasks and other resources within the data center 814. By way of example, the fabric controller 818 may rely on a service model (e.g., designed by a customer that owns the distributed application) to provide guidance on how, where, and when to configure server 822 and how, where, and when to place application 826 and application 828 thereon. In one example, one or more role instances of a distributed application may be placed on one or more of the servers of data center 814, where the one or more role instances may represent the portions of software, component programs, or instances of roles that participate in the distributed application. In another example, one or more of the role instances may represent stored data that is accessible to the distributed application.

Data center 816 illustrates a data center comprising a plurality of nodes, such as node 832 and node 834. One or more virtual machines may run on nodes of data center 816, such as virtual machine 836 of node 834 for example. Although FIG. 8 depicts a single virtual node on a single node of data center 816, any number of virtual nodes may be implemented on any number of nodes of the data center in accordance with illustrative examples of the disclosure. Generally, virtual machine 836 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine 836 may include processing capacity, storage locations, and other assets within the data center 816 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 830 is responsible for automatically managing the virtual machines running on the nodes of data center 816 and for placing the role instances and other resources (e.g., software components) within the data center 816. By way of example, the fabric controller 830 may rely on a service model (e.g., designed by a customer that owns the service application) to provide guidance on how, where, and when to configure the virtual machines, such as virtual machine 836, and how, where, and when to place the role instances thereon.

As discussed above, the virtual machines may be dynamically established and configured within one or more nodes of a data center. As illustrated herein, node 832 and node 834 may be any form of computing devices, such as, for example, a personal computer, a desktop computer, a laptop computer, a mobile device, a consumer electronic device, server(s), the computing device 100 of FIG. 1, and the like. In one instance, the nodes host and support the operations of the virtual machines, while simultaneously hosting other virtual machines carved out for supporting other tenants of the data center 816, such as internal services 838 and hosted services 840. Often, the role instances may include endpoints of distinct service applications owned by different customers.

Typically, each of the nodes include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role instances that reside on the nodes support operation of service applications, and may be interconnected via application programming interfaces (APIs). In one instance, one or more of these interconnections may be established via a network cloud, such as public network 802. The network cloud serves to interconnect resources, such as the role instances, which may be distributably placed across various physical hosts, such as nodes 832 and 834. In addition, the network cloud facilitates communication over channels connecting the role instances of the service applications running in the data center 816. By way of example, the network cloud may include, without limitation, one or more local area networks (LANs) and/or wide area networks (WANs). Such networking environments are commonplace in offices, enterprise-wide computer networks, intranets, and the Internet. Accordingly, the network is not further described herein.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for providing global time for a distributed computing system using a logical clock.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A method for providing global timestamps comprising:
   selecting, by a source node, a global time using a local clock of the source node;
   receiving, without requesting, a message from another node, the message from the another node including a timestamp from another local clock of the another node, the timestamp corresponding to a first time the message was sent;
   determining, at a node other than the another node, an uncertainty bound for the selected global time and the another local clock of the another node; and
   providing, from the node other than the another node, the uncertainty bound and the selected global time to the another node, wherein the another node sets a clock skew based on the uncertainty bound and the selected global time, the clock skew used to label local events of the another node with a global timestamp interval determined based on the another local clock of the another node and the clock skew, labeling of the local events with the global timestamp interval improving efficiency and accuracy of ordering the local events.

2. The method of claim 1, wherein determining the uncertainty bound further comprises:
   comparing the timestamp included with the received message to a second time the message was received by the source node, the second time the message was received based on the selected global time set by the source node; and
   calculating an upper bound of the clock skew for the another node based on a difference between the second time the message was received by the source node and the first time the message was sent by the another node.

3. The method of claim 2, wherein the another node receives the upper bound of the clock skew from the source node via another message, the another message including another timestamp corresponding to another time the another message was sent by the source node based on the selected global time set by the source node, and wherein the another node calculates a lower bound for the clock skew using the upper bound and the another timestamp.

4. The method of claim 1, wherein the source node performs a leader node role, and wherein the leader node role shifts to the another node in response to the source node becoming unavailable.

5. The method of claim 1, wherein the source node receives a subsequent message from the another node and provides an updated uncertainty bound to the another node.

6. One or more computer storage devices having computer-executable instructions stored thereon, which, on execution by a computer, cause the computer to perform operations comprising:
   a first node joining a network comprising a plurality of nodes;
   the first node sending a first message to a second node of the plurality of nodes, the first message including a first timestamp corresponding to a first time the first message is sent as generated by a first local clock of the first node;
   the first node receiving a second message from the second node, the second message including a first upper bound of a first clock skew for the first node, a second lower bound of a second clock skew for the second node, and a global timestamp corresponding to a second time the second message is sent by the second node;
   the first node determining a first lower bound of the first clock skew for the first node using the first upper bound of the first clock skew for the first node, the second lower bound of the second clock skew for the second node, and the global timestamp of the received second message;
   the first node setting a clock skew interval for the first local clock of the first node using the determined first lower bound and received first upper bound of the first clock skew; and
   the first node labeling a local event with a global timestamp interval determined using the clock skew interval and the first local clock to improve efficiency and accuracy of ordering local events of the plurality of nodes.

7. The one or more computer storage devices of claim 6, further comprising:
   a leader election mechanism detecting unavailability of a leader node from the plurality of nodes; and
   the leader election mechanism electing the first node as a new leader node.

8. The one or more computer storage devices of claim 7, further comprising:
   the first node as the new leader node setting a new global time using the first local clock of the first node.

9. The one or more computer storage devices of claim 6, further comprising:
   the first node receiving a third message from a third node, the third message including a third timestamp corresponding to a third time the third message is sent as generated by a third local clock of the third node;
   the first node calculating a third upper bound of a third clock skew for the third node using the third timestamp corresponding to the third time the third message is sent and the clock skew interval for the first local clock of the first node; and
   the first node sending a fourth message to the third node, the fourth message including the third upper bound of the third clock skew for the third node and another global timestamp corresponding to a fourth time the fourth message is sent by the first node.

10. The one or more computer storage devices of claim 6, wherein the clock skew interval for the first local clock of the first node is updated at each message exchange with another node of the plurality of nodes.

11. The one or more computer storage devices of claim 6, wherein system events executed across the plurality of nodes within the network are labeled with the global timestamp interval.

12. A system for providing global timestamps, said system comprising:
   a node connected to a plurality of nodes via a network; and
   a logical clock, implemented on the node, that sets a global time for the network, such that another node of the plurality of nodes labels a local event with a global timestamp interval determined based on the global time provided by the logical clock,
   wherein the node receives, without requesting, a message from the another node including a timestamp from a local clock of the another node indicating a time the message was sent, determines an uncertainty bound for the global time and the local clock of the another node, and provides the uncertainty bound and the global time to the another node that sets a clock skew based on the uncertainty bound and the global time; and wherein labeling the local event with the global timestamp interval determined based on the local clock of the another node and the clock skew improves efficiency and accuracy of ordering local events of the plurality of nodes.

13. The system of claim 12, wherein the node is a leader node elected by a leader election mechanism within the network.

14. The system of claim 13, further comprising:

the another node of the plurality of nodes, the another node elected as a new leader node in response to the node becoming unavailable as the leader node; and another logical clock implemented on the another node, wherein the another logical clock is an instance of the logical clock, the another logical clock setting a new global time for the network based on electing the another node as the new leader node.

15. The system of claim 12, wherein the node exchanges one or more messages with at least one other node of the plurality of nodes, the one or more messages including the global time set by the logical clock.

16. The system of claim 15, wherein the at least one other node comprises another local clock, and wherein the at least one other node sets a local clock skew based on a difference between the global time and a local time of the another local clock.

17. The system of claim 12, further comprising:

a plurality of logical clock components implemented on the plurality of nodes in the network, such that a given node comprises an instance of the logical clock.

18. The system of claim 17, wherein an individual logical clock component of the plurality of logical clock components sets a respective clock skew for each node of the plurality of nodes based on information from one or more message exchanges between one or more nodes of the plurality of nodes in the network.

19. The system of claim 12, further comprising:

another local clock implemented on the node, the logical clock setting the global time for the network based on the another local clock.

* * * * *